US012745878B2

(12) United States Patent
Li

(10) Patent No.: US 12,745,878 B2
(45) Date of Patent: Sep. 29, 2026

(54) MULTIFUNCTIONAL CUTTING BOARD

(71) Applicant: Yuyao Nuodun Electric Co., Ltd., Yuyao (CN)

(72) Inventor: Wujian Li, Yuyao (CN)

( * ) Notice: Subject to any disclaimer, the term of this patent is extended or adjusted under 35 U.S.C. 154(b) by 287 days.

(21) Appl. No.: 18/639,377

(22) Filed: Apr. 18, 2024

(65) Prior Publication Data

US 2025/0107668 A1 Apr. 3, 2025

(30) Foreign Application Priority Data

Sep. 28, 2023 (CN) ......................... 202322650327.0

(51) Int. Cl.
*A47J 47/00* (2006.01)

(52) U.S. Cl.
CPC .................................. *A47J 47/005* (2013.01)

(58) Field of Classification Search
CPC ................................ A47J 47/005; A47J 47/00
See application file for complete search history.

(56) References Cited

U.S. PATENT DOCUMENTS

| | | | | | |
|---|---|---|---|---|---|
| 1,774,551 | A * | 9/1930 | Hackett | A47J 47/005 | 30/143 |
| 3,798,811 | A * | 3/1974 | Rockola | G07F 17/305 | 40/505 |
| 4,002,022 | A * | 1/1977 | Lopez C. | G04B 19/065 | 368/227 |
| 5,203,548 | A * | 4/1993 | Sanders | A47J 47/005 | 269/302.1 |
| 5,315,776 | A * | 5/1994 | Strawbridge | G09F 11/025 | 40/505 |
| 5,692,330 | A * | 12/1997 | Anderson, Jr. | G09F 11/025 | 40/493 |
| 11,964,406 | B2 * | 4/2024 | Chen | B26D 7/20 | |
| 2006/0060052 | A1 * | 3/2006 | Okada | A47J 47/005 | 83/659 |
| 2009/0250860 | A1 * | 10/2009 | Hsu | A47J 47/005 | 269/309 |
| 2015/0069691 | A1 * | 3/2015 | Chen | A47J 47/005 | 269/55 |
| 2024/0016340 | A1 * | 1/2024 | Guerrero | A47J 47/005 | |
| 2025/0107668 | A1 * | 4/2025 | Li | A47J 47/005 | |

* cited by examiner

*Primary Examiner* — Lee D Wilson

(57) ABSTRACT

The invention provides a multifunctional cutting board with simple structure and convenient use; the multifunctional cutting board comprises: a base, at least one rotatable bracket is arranged on the base; the brackets are provided with several boards along the rotation direction, the materials of the several boards can be the same material or different materials, rotating the brackets can rotate the boards of the needed position and leak them out for use; the invention relates to the technical field of kitchen utensils.

6 Claims, 10 Drawing Sheets

MULTIFUNCTIONAL CUTTING BOARD

1. TECHNICAL FIELD

The invention relates to the technical field of kitchen utensils, in particular to a multifunctional cutting board.

2. BACKGROUND ART

A cutting board, also known as a chopping board, is an item placed underneath when pounding, cutting, chopping, or smashing things, commonly used for preparing cooking ingredients.

Please refer to the publication number CN215016482U for a cutting board, which is a common structure of cutting boards currently available on the market. The main difference lies in the material distinction, such as wooden cutting boards, bamboo cutting boards, plastic cutting boards, tempered glass cutting boards, and stainless steel cutting boards, etc. These cutting boards have relatively simple structures. When there is a variety of ingredients that need to be cut, users need to use cutting boards of different materials for cutting operations (for example, wooden and stainless steel cutting boards are suitable for cutting meat ingredients; bamboo and plastic cutting boards are suitable for cutting fruits and vegetables). It can be seen that the cutting boards available on the market have poor functionality and applicability, leading to a suboptimal user experience.

3. SUMMARY OF THE INVENTION

In view of the shortcomings and defects of the existing technology, a multifunctional cutting board with simple structure and convenient use is provided.

A multifunctional cutting board comprises:

a base, at least one rotatable bracket is arranged on the base;

the brackets are provided with several boards along the rotation direction, the materials of the several boards can be the same material or different materials, rotating the brackets can rotate the boards of the needed position upward and leak them out for use.

After adopting the above structure, the multifunctional cutting board of the invention has the following advantages compared with the existing technology: the boards can be configured as stainless steel boards, soft rubber boards, wooden boards, etc. as needed to meet various use needs, for example: stainless steel boards are used for cutting meaty ingredients, soft rubber boards and plastic boards are used for cutting melons, fruits and vegetables. The device can be integrated with boards that meet the needs of different cutting operations.

When in use, rotating the brackets can rotate the boards of the needed position and leak them out (the boards are rotated upward for food materials to be placed), and then the user can perform cutting operations.

After the above improvements, the device has the characteristics of multiple functions, simple structure, easy use, and good user experience.

As an improvement of the invention, the structure of the bracket is polygonal prism, the adjacent edges of the bracket with a polygonal prism structure form installation end faces, the installation end face is provided with an installation slot, the boards are detachably connected to the installation slot.

As an improvement of the invention, several brackets are provided, and the several brackets are arranged horizontally on the base, the adjacent brackets are connected through a transmission mechanism that rotates synchronously.

As an improvement of the invention, a first pin roll is arranged at the front end of the bracket, and the first pin roll passes through the first connection hole on the base, a sliding sleeve is arranged between the first connecting hole and the first pin roll, and the sliding sleeve and the first pin roll are circumferentially locked;

the transmission mechanism comprises a first gear sleeved on the sliding sleeve, and a transmission gear meshed between adjacent first gears.

As an improvement of the invention, one of the sliding sleeves serves as the movable sliding sleeve, and the movable sliding sleeve can move axially along the first pin roll, and the movable sliding sleeve is provided with sliding grooves along the axial direction, the corresponding first pin roll is provided with guide keys that fit in the sliding grooves;

the base is provided with positioning slots, the sliding sleeve is provided with positioning blocks that match the positioning slots, moving the movable sliding sleeve axially can make the positioning blocks enter the positioning slots or move out of the positioning slots.

As an improvement of the invention, the positioning slots are arranged at the tail end of the first connection hole, and are slotted radially outward along the first connection hole, the tail end of the movable sliding sleeve penetrates into the first connection hole, and the positioning blocks are arranged at the tail end of the movable sliding sleeve, the positioning blocks enter and exit from the tail openings of the positioning slots.

As an improvement of the invention, an elastic member is arranged between the movable sliding sleeve and the corresponding first pin roll, the elastic member drives the movable sliding sleeve to always have an axial reset tendency.

As an improvement of the invention, the movable sliding sleeve is also provided with a handle.

As an improvement of the invention, the base is a frame structure with an assembly space inside, the brackets are arranged in the assembly space, the tail end of the bracket is provided with a second pin roll, the second pin roll penetrates into a second connection hole on the side wall of the assembly space.

4. BRIEF DESCRIPTION OF ACCOMPANY DRAWINGS

As shown in the figures: 1 base; 1.1 first connection hole; 1.2 positioning slot; 1.3 assembly space; 2 bracket; 2.1 board; 2.2 installation slot; 2.3 first pin roll; 2.31 guide key; 2.4 second pin roll; 3 transmission mechanism; 3.1 first gear; 3.2 transmission gear; 4 sliding sleeve; 4.1 movable sliding sleeve; 4.11 sliding groove; 4.12 positioning block; 4.13 handle; 4.14 blocking part; 5 elastic member.

5. SPECIFIC EMBODIMENT OF THE INVENTION

The invention will be further described below in combination with the accompanying drawings and specific embodiments.

Figure 1:
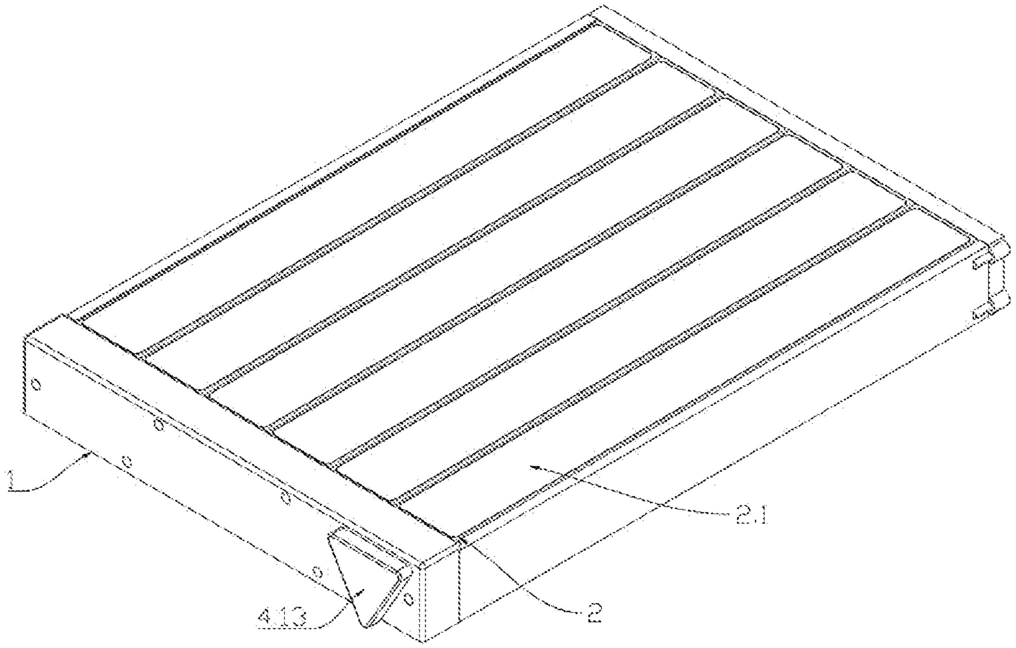
FIG. 1 is a schematic diagram of the brackets of the invention when they are rotated upward until the boards leak out.
Figure 2:
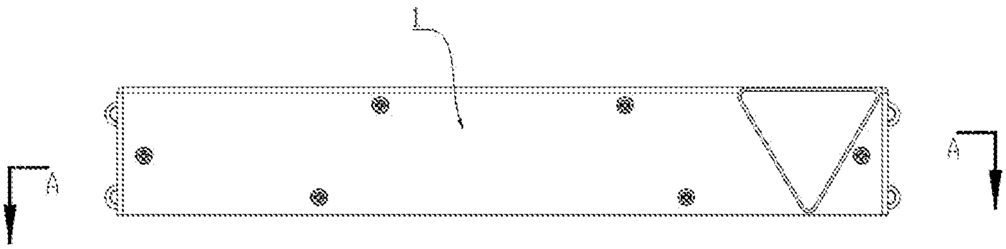
FIG. 2 is a front view of the structure of the invention.
Figure 3:
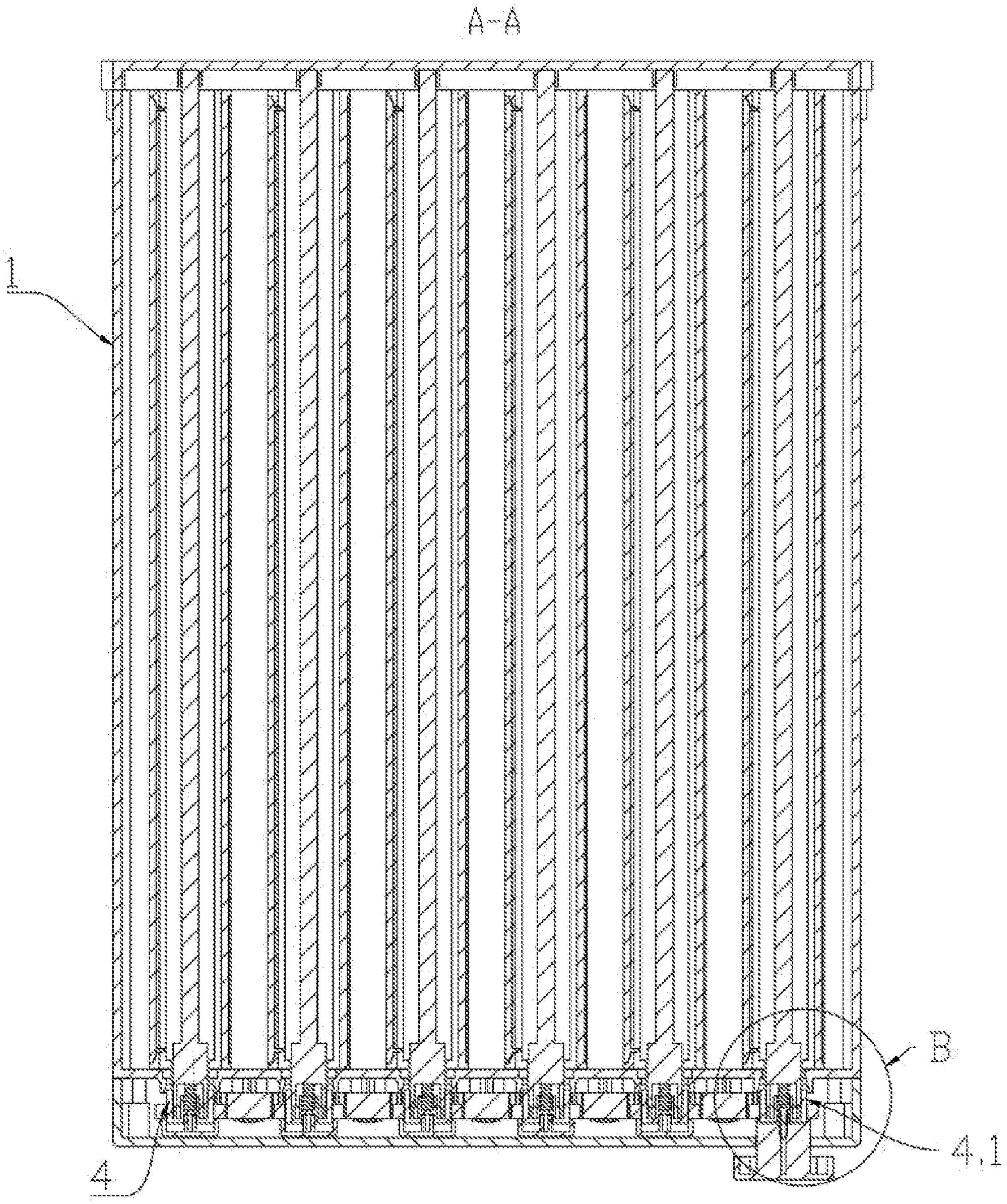
FIG. 3 is a cross-sectional diagram of the invention taken along the A-A direction in FIG. 2.
Figure 4:
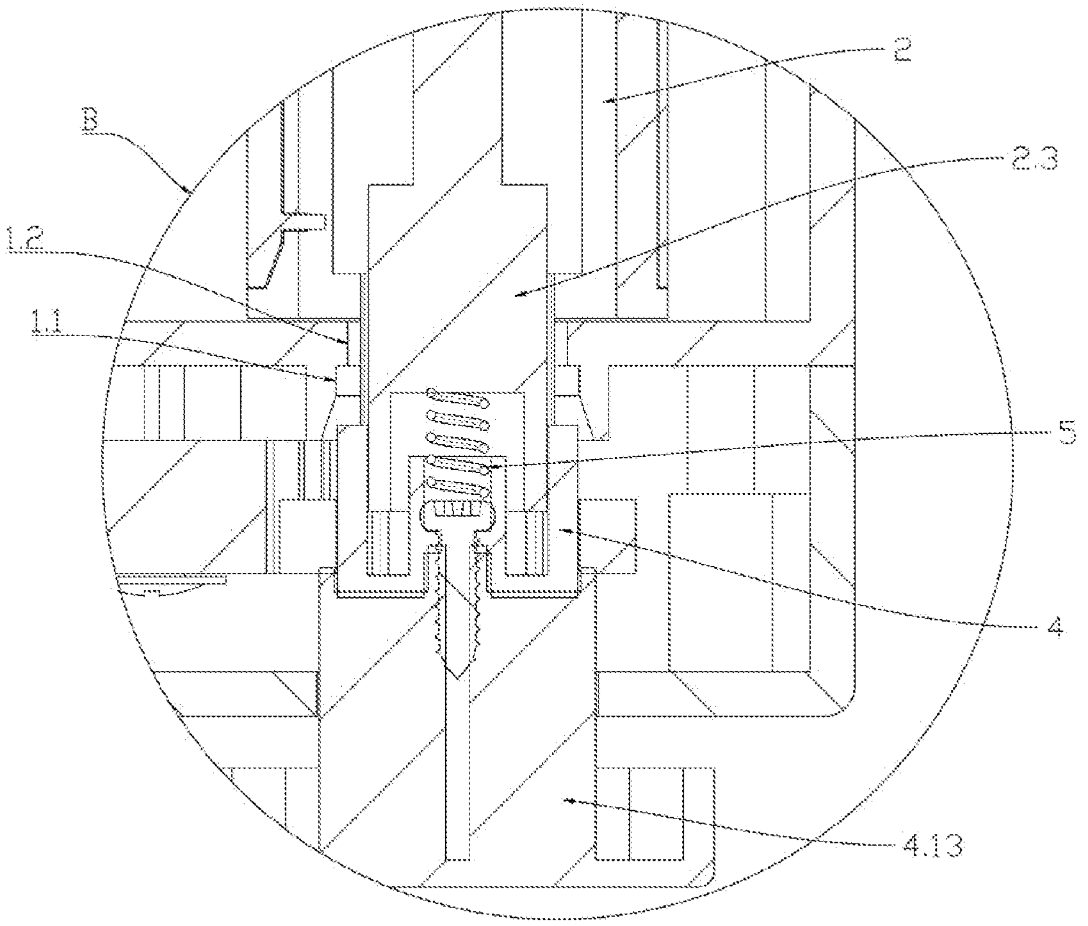
FIG. 4 is an enlarged schematic diagram of the structure at B in FIG. 3 of the invention.
Figure 5:
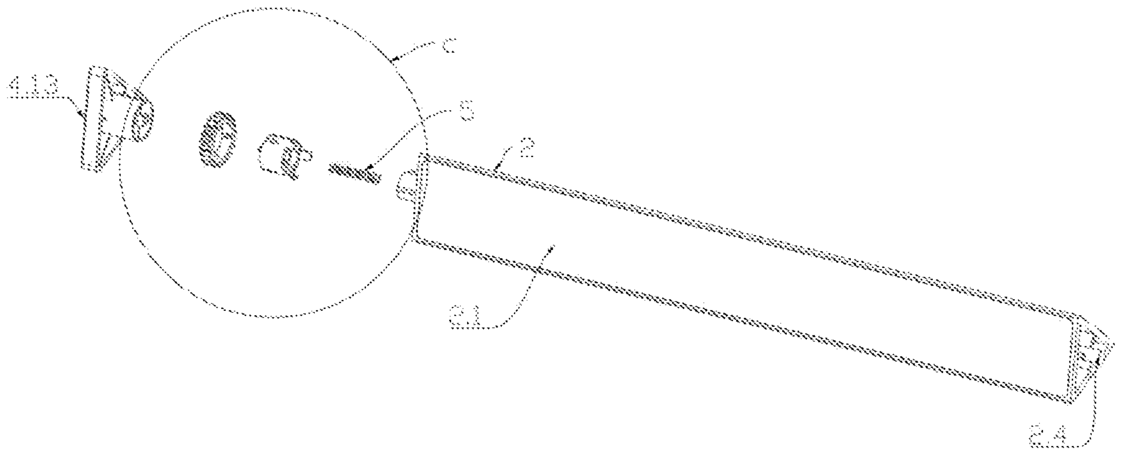
FIG. 5 is a schematic diagram of the structures of the first pin roll connected by the movable sliding sleeve of the invention and the corresponding bracket when the components are exploded.
Figure 6:
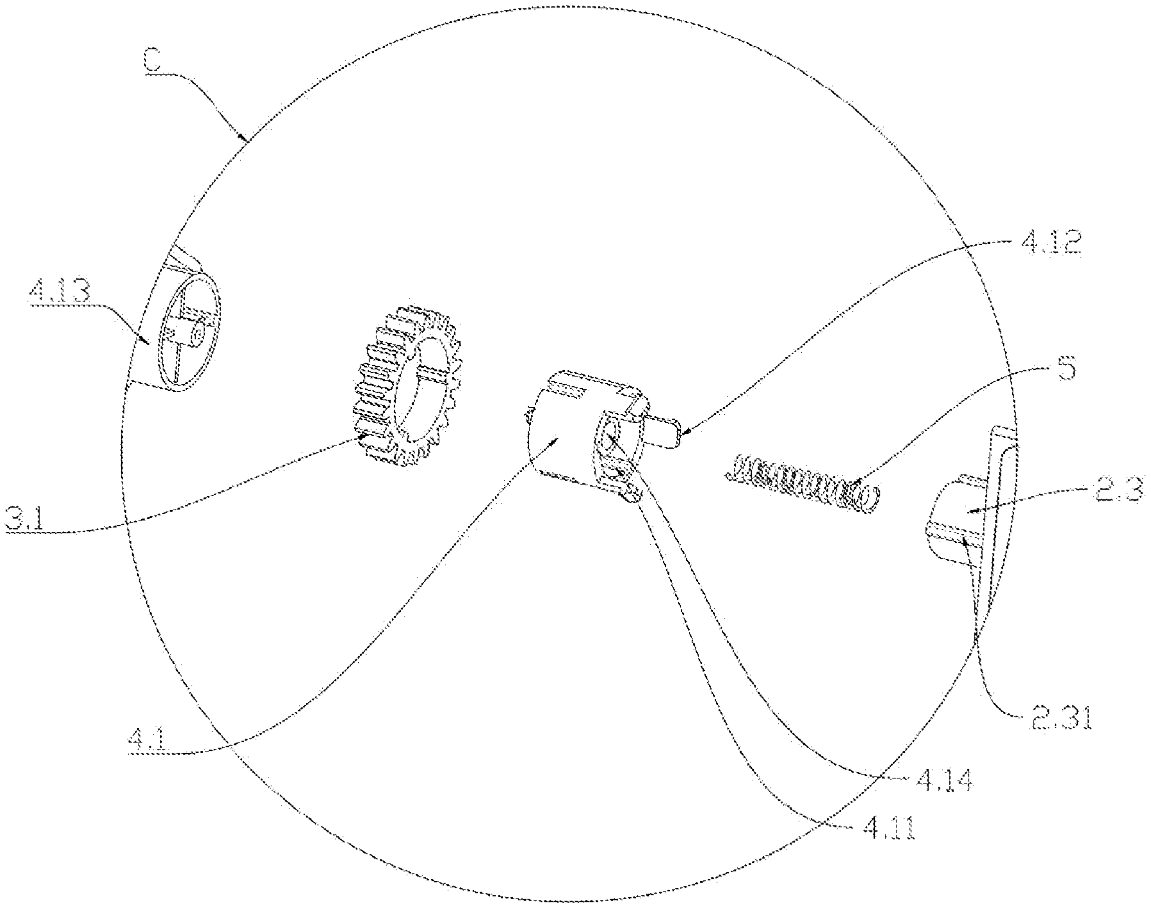
FIG. 6 is an enlarged schematic diagram of the structure at C in FIG. 5 of the invention.
Figure 7:
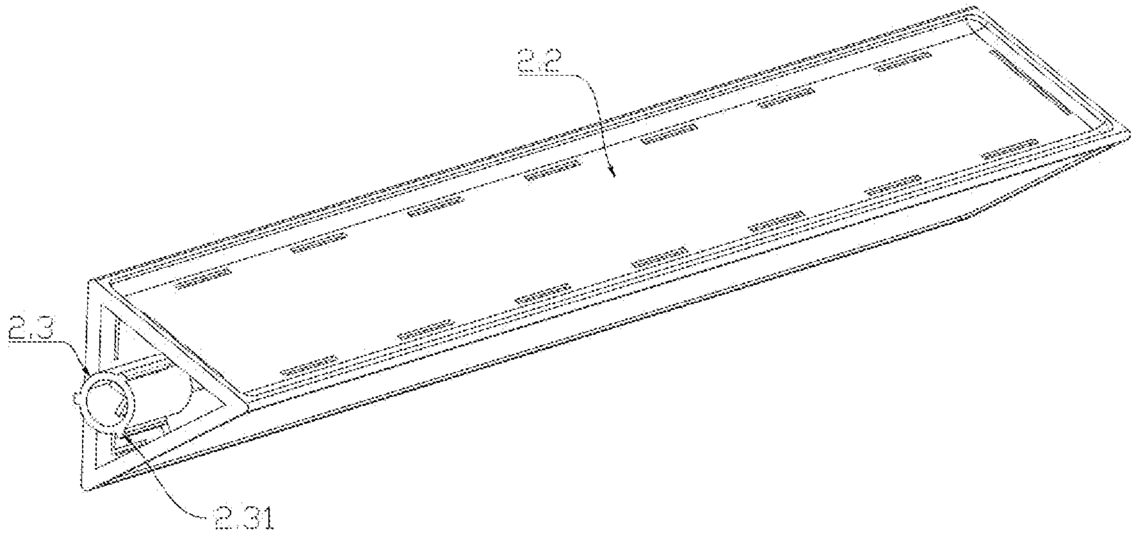
FIG. 7 is a schematic diagram of the structure of the bracket of the invention.
Figure 8:
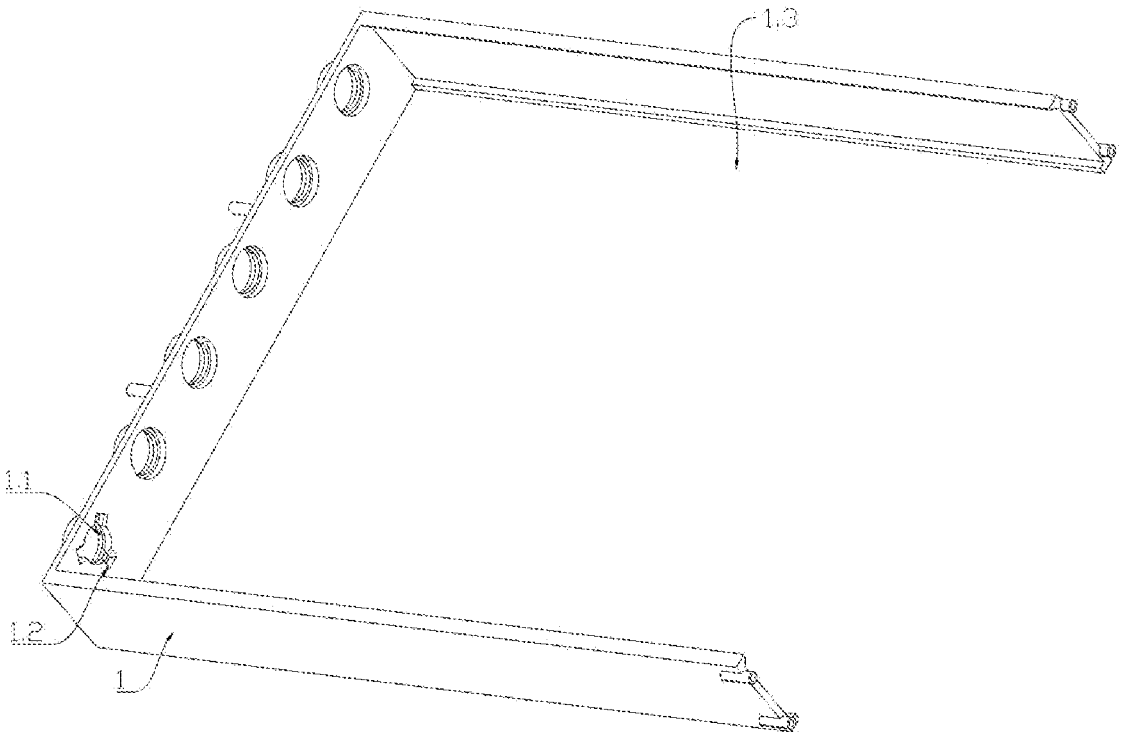
FIG. 8 is a schematic diagram of the structure of the base of the invention.
Figure 9:
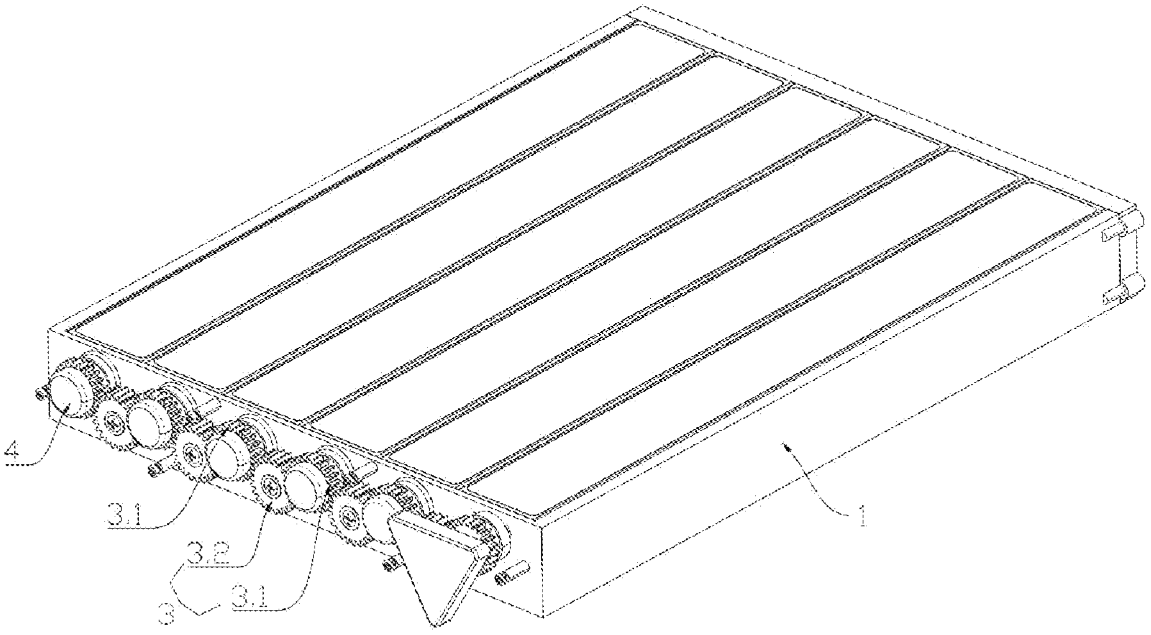
FIG. 9 is a schematic diagram of the structure of the transmission mechanism of the invention.
Figure 10:
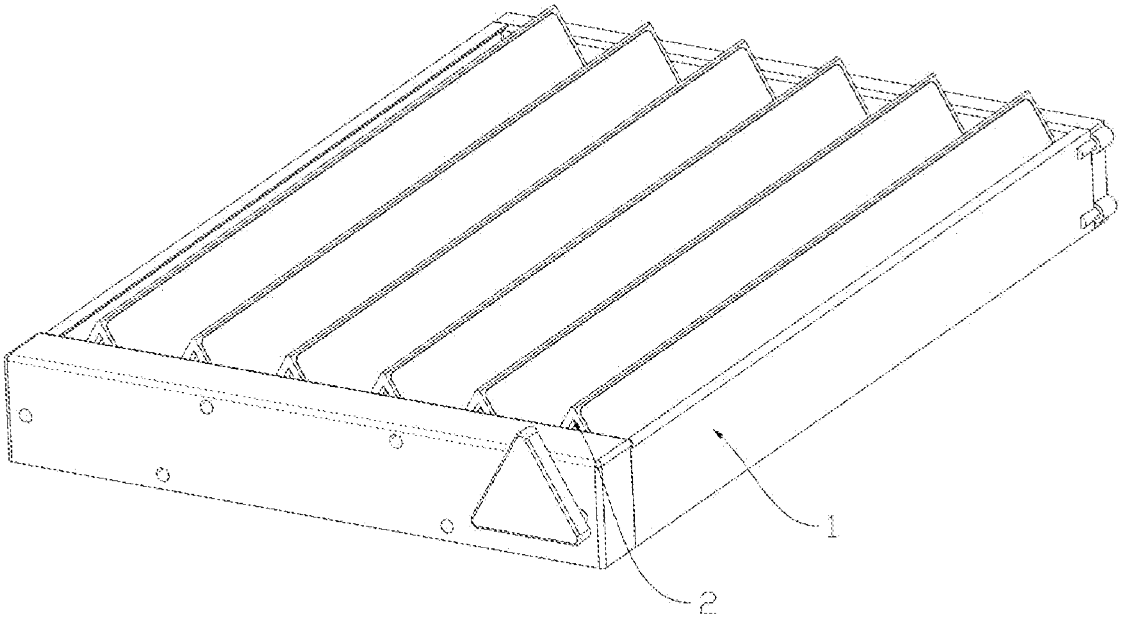
FIG. 10 is a schematic diagram of the brackets of the invention during rotation.

Please refer to FIG. 1-10, a multifunctional cutting board comprises:

a base 1, at least one rotatable bracket 2 is arranged on the base 1;

the brackets 2 are provided with several boards 2.1 along the rotation direction, the materials of the several boards 2.1 can be the same material or different materials, rotating the brackets 2 can rotate the boards 2.1 of the needed position upward and leak them out for use.

After adopting the above structure, the multifunctional cutting board of the invention has the following advantages compared with the existing technology: the boards 2.1 can be configured as stainless steel boards 2.1, soft rubber boards 2.1, wooden boards 2.1, etc. as needed to meet various use needs, for example: stainless steel boards 2.1 are used for cutting meaty ingredients, soft rubber boards 2.1 and plastic boards 2.1 are used for cutting melons, fruits and vegetables. The device can be integrated with boards 2.1 that meet the needs of different cutting operations.

When in use, rotating the brackets 2.1 can rotate the boards 2.1 of the needed position and leak them out (the boards 2.1 are rotated upward for food materials to be placed), and then the user can perform cutting operations.

After the above improvements, the device has the characteristics of multiple functions, simple structure, easy use, and good user experience.

As an improvement of the invention, the structure of the bracket 2 is polygonal prism, the adjacent edges of the bracket 2 with a polygonal prism structure form installation end faces, the installation end face is provided with an installation slot 2.2, the boards 2.1 are detachably connected to the installation slot 2.2. After the above improvements, the brackets 2 adopt the polygonal prism structure, the brackets 2 are detachably connected in the installation slot 2.2 on the installation end surface between adjacent edges, and has the characteristics of compact structure, good aesthetics, and simplicity and reliability; in addition, the user can disassemble and assemble the boards 2.1 by himself for maintenance or replacement.

One of the installation end faces does not need to install the board 2.1, and there is no need to open an installation slot 2.2. This end face is used as an idle end face. When no cutting operation is performed, the brackets 2 can be rotated to this end face to set it upward. At this time, the other end faces of the boards 2.1 are in the downward direction, which can reduce the adhesion of external debris and improve the cleanliness and aesthetics.

As an improvement of the invention, several brackets 2 are provided, and the several brackets 2 are arranged horizontally on the base 1, the adjacent brackets 2 are connected through a transmission mechanism 3 that rotates synchronously. Multiple brackets 2 with the same structure and consistent arrangement of boards 2.1 are provided; the adjacent brackets 2 are connected through the transmission mechanism 3 that rotates synchronously; when one of the brackets 2 is rotated, the other brackets 2 can be rotated together until the boards 2.1 of the required material are leaked out uniformly for cutting purposes.

After the above improvements, the volume of each bracket 2 can be designed to be relatively small, which improves the compactness and aesthetics of the structure. In addition, multiple brackets 2 rotate synchronously, have consistent movements, and operate reliably. When multiple brackets 2 are rotated to the required level, the cutting area available to the user is large.

As an improvement of the invention, a first pin roll 2.3 is arranged at the front end of the bracket 2, and the first pin roll 2.3 passes through the first connection hole 1.1 on the base 1, a sliding sleeve 4 is arranged between the first connecting hole 1.1 and the first pin roll 2.3, and the sliding sleeve 4 and the first pin roll 2.3 are circumferentially locked;

the transmission mechanism 3 comprises a first gear 3.1 sleeved on the sliding sleeve 4, and a transmission gear 3.2 meshed between adjacent first gears 3.1. The sliding sleeve 4 is circumferentially locked with the first pin roll 2.3; the rotation of the sliding sleeve 4 drives the first pin roll 2.3 to rotate, thereby causing the bracket 2 to rotate and switch the board 2.1.

The sliding sleeve 4 is provided with the first gear 3.1; the first gears 3.1 of the adjacent brackets 2 are linked through the meshing transmission gear 3.2, so that the multiple brackets 2 rotate synchronously. The structural design of the gear transmission is adopted, which has the characteristics of simple structure and reliable operation.

As an improvement of the invention, one of the sliding sleeves 4 serves as the movable sliding sleeve 4.1, and the movable sliding sleeve 4.1 can move axially along the first pin roll 2.3, and the movable sliding sleeve 4.1 is provided with sliding grooves 4.11 along the axial direction, the corresponding first pin roll 2.3 is provided with guide keys 2.31 that fit in the sliding grooves 4.11;

the base 1 is provided with positioning slots 1.2, the sliding sleeve 4 is provided with positioning blocks 4.12 that match the positioning slots 1.2, moving the movable sliding sleeve 4.1 axially can make the positioning blocks 4.12 enter the positioning slots 1.2 or move out of the positioning slots 1.2. The positioning slots 1.2 are arranged at the tail end of the first connection hole 1.1, and are slotted radially outward along the first connection hole 1.1, the tail end of the movable sliding sleeve 4.1 penetrates into the first connection hole 1.1, and the positioning blocks 4.12 are arranged at the tail end of the movable sliding sleeve 4.1, the positioning blocks 4.12 enter and exit from the tail openings of the positioning slots 1.2.

Preferably, the front end of the first pin roll 2.3 extends from the first connection hole 1.1 to the outside, the movable sliding sleeve 4.1 is arranged on the front end of the first pin roll 2.3 of the rightmost bracket 2, and the tail end extends into the connection hole;

the openings of the positioning slots 1.2 are located at the tail end of the first connection hole 1.1, and are radially slotted toward the front end of the first connection hole 1.1;

the positioning blocks 4.12 are located at the rear end of the movable sliding sleeve 4.1 and extends backward away from the tail end of the movable sliding sleeve 4.1, they enters and exits the positioning slots 1.2 from the tail openings of the positioning slots 1.2;

the sliding grooves 4.11 are arranged inside the movable sliding sleeve 4.1, and the guide keys 2.31 are arranged outside the first pin roll 2.3, the movable sliding sleeve 4.1 and the first pin roll 2.3 achieve synchronous rotation through the cooperation of the sliding grooves 4.11 and the guide keys 2.31; the moving sliding sleeve 4.1 can move forward along the axial direction of the first pin roll 2.3, or move backward along the axial direction;

when the movable sliding sleeve 4.1 moves backward, the positioning blocks 4.12 move out of the positioning slots 1.2; at this time, rotating the movable sliding sleeve 4.1, under the action of the transmission mechanisms 3, the multiple brackets 2 rotate synchronously to rotate the boards 2.1 of the required material and leak them out for use;

when the boards 2.1 are rotated to the desired position, the moving sliding sleeve 4.1 is moved forward, and the positioning blocks 4.12 enter the positioning slots 1.2; at this time, the positioning blocks 4.12 fit the positioning slots 1.2, restricting the circumferential rotation of the moving sliding sleeve 4.1; therefore, the moving sliding sleeve 4.1 cannot rotate, the transmission mechanisms cannot rotate, multiple brackets 2 are in fixed positions, so that the stability and reliability of the brackets 2 are improved.

As an improvement of the invention, an elastic member is arranged between the movable sliding sleeve 4.1 and the corresponding first pin roll 2.3, the elastic member drives the movable sliding sleeve 4.1 to always have an axial reset tendency. The first pin roll 2.3 has a cavity inside, and the movable sliding sleeve 4.1 is provided with a blocking part 4.14 that extends into the cavity; the elastic member is a spring, the spring is placed in the cavity, one end of the spring abuts against the blocking part 4.14, and the other end abuts against the cavity; the spring drives the movable sliding sleeve 4.1 to have a preload force for forward movement, when the user moves the movable sliding sleeve 4.1 backward, the spring is compressed, after the movable sliding sleeve 4.1 moves forward until the positioning blocks 4.12 enter the positioning slots 1.2, the pre-tightening effect of the spring makes the positioning blocks 4.12 stably stay in the positioning slots 1.2, and will not come out without human intervention, further improving the stability, and reliability of the bracket 2.

As an improvement of the invention, the movable sliding sleeve 4.1 is also provided with a handle 4.13. The handle 4.13 adopts a triangular structure design to facilitate the user to press and rotate the movable sliding sleeve 4.1

As an improvement of the invention, the base 1 is a frame structure with an assembly space 1.3 inside, the brackets 2 are arranged in the assembly space 1.3, the tail end of the bracket 2 is provided with a second pin roll 2.4, the second pin roll 2.4 penetrates into a second connection hole on the side wall of the assembly space 1.3. After the above improvements, multiple brackets 2 are placed in the assembly space 1.3, and the front and rear ends of the brackets 2 are connected to the base 1 respectively, with multiple connection points to make the connection stable and reliable; in addition, the frame covers some parts of the brackets 2 and the transmission mechanisms 3, which plays a certain protective role and extends the service life of the device.

The above are only preferred embodiments of the invention. The protection scope of the invention is not limited to the above embodiments. All technical schemes falling under the idea of the invention belong to the protection scope of the invention. It should be pointed out that for those of ordinary skill in the art, several improvements and modifications can be made without departing from the principles of the invention. These improvements and modifications should also be regarded as the protection scope of the invention.

What is claimed is:

1. A multifunctional cutting board comprises:

a base, wherein the base has at least two sides configured to connect and fix the bracket to enable rotational positioning thereof, at least one rotatable bracket is arranged on the base;

the bracket is provided with several boards along the rotation direction, the materials of the several boards can be the same material or different materials, rotating the bracket can rotate the boards of the needed position upward for use;

several brackets are provided, and the several brackets are arranged horizontally on the base, the adjacent brackets are connected through a transmission mechanism that rotates synchronously;

a first pin roll is arranged at the front end of the bracket, and the first pin roll passes through the first connection hole on the base, a sliding sleeve is arranged between the first connecting hole and the first pin roll, and the sliding sleeve and the first pin roll are circumferentially locked;

the transmission mechanism comprises a first gear sleeved on the sliding sleeve, and a transmission gear meshed between adjacent first gears;

one of the sliding sleeves serves as the movable sliding sleeve, and the movable sliding sleeve can move axially along the first pin roll, and the movable sliding sleeve is provided with sliding grooves along the axial direction, the corresponding first pin roll is provided with guide keys that fit in the sliding grooves;

the base is provided with positioning slots, the sliding sleeve is provided with positioning blocks that match the positioning slots, moving the movable sliding sleeve axially can make the positioning blocks enter the positioning slots or move out of the positioning slots.

2. The multifunctional cutting board of claim 1, the structure of the bracket is polygonal prism, the adjacent edges of the bracket with a polygonal prism structure form installation end faces, the installation end face is provided with an installation slot, the boards are detachably connected to the installation slot.

3. The multifunctional cutting board of claim 1, the positioning slots are arranged at the tail end of the first connection hole, and are slotted radially outward along the first connection hole, the tail end of the movable sliding sleeve penetrates into the first connection hole, and the positioning blocks are arranged at the tail end of the movable sliding sleeve, the positioning blocks enter and exit from the tail openings of the positioning slots.

4. The multifunctional cutting board of claim 1, an elastic member is arranged between the movable sliding sleeve and the corresponding first pin roll, the elastic member drives the movable sliding sleeve to always have an axial reset tendency.

5. The multifunctional cutting board of claim 1, a movable sliding sleeve is also provided with a handle.

6. The multifunctional cutting board of claim 1, the base is a frame structure with an assembly space inside, the brackets are arranged in the assembly space, the tail end of the bracket is provided with a second pin roll, the second pin roll penetrates into a second connection hole on the side wall of the assembly space.

* * * * *